US012013170B2

(12) United States Patent
Salmela et al.

(10) Patent No.: US 12,013,170 B2
(45) Date of Patent: Jun. 18, 2024

(54) DEVICE AND METHOD FOR PROVIDING A THERMALLY CONDUCTIVE COUPLING

(71) Applicant: Bluefors Oy, Helsinki (FI)

(72) Inventors: Anssi Salmela, Helsinki (FI); Pieter Vorselman, Helsinki (FI); Rob Blaauwgeers, Helsinki (FI)

(73) Assignee: BLUEFORS OY, Helsinki (FI)

( * ) Notice: Subject to any disclaimer, the term of this patent is extended or adjusted under 35 U.S.C. 154(b) by 0 days.

(21) Appl. No.: 17/998,627

(22) PCT Filed: May 11, 2021

(86) PCT No.: PCT/FI2021/050347

§ 371 (c)(1),
(2) Date: Nov. 11, 2022

(87) PCT Pub. No.: WO2021/229149

PCT Pub. Date: Nov. 18, 2021

(65) Prior Publication Data

US 2023/0175756 A1 Jun. 8, 2023

(30) Foreign Application Priority Data

May 13, 2020 (FI) ...................................... 20205481

(51) Int. Cl.
*F25D 19/00* (2006.01)
*F17C 3/08* (2006.01)
*F25B 9/12* (2006.01)

(52) U.S. Cl.
CPC ............ *F25D 19/006* (2013.01); *F17C 3/085* (2013.01); *F25B 9/12* (2013.01); *F25D 19/003* (2013.01)

(58) Field of Classification Search
CPC ........ F25D 19/006; F25D 19/003; F25B 9/12; H01L 2023/4081; H01L 2023/4087
See application file for complete search history.

(56) References Cited

U.S. PATENT DOCUMENTS 3,306,075 A 2/1967 Cowans
4,344,302 A 8/1982 Jarrett, Jr. et al.
(Continued)

FOREIGN PATENT DOCUMENTS

CN 210074730 U 2/2020
EP 2409096 B1 † 8/2019
(Continued)

OTHER PUBLICATIONS

ISA European Patent Office, International Search Report Issued in Application No. PCT/FI2021/050347, Jul. 23, 2021, WIPO, 2 pages.
(Continued)

*Primary Examiner* — David J Teitelbaum
(74) *Attorney, Agent, or Firm* — McCoy Russell LLP

(57) ABSTRACT

A device intended for cooling an object being moved within a cryostat comprises a heat transfer section forming a contact surface for said object and means for fastening the heat transfer section to a cooling structure in such a way that said contact surface remains free. The device comprises a spring section which is separate from said heat transfer section and which is arranged to exert on the heat transfer section a spring force pushing said contact surface in a direction in which it is intended to contact said object.

13 Claims, 5 Drawing Sheets

(56) References Cited

U.S. PATENT DOCUMENTS

| | | | | |
|---|---|---|---|---|
| 4,707,726 A * | 11/1987 | Tinder | H01L 23/4093 257/796 |
| 5,170,325 A | 12/1992 | Bentz et al. | |
| 5,730,210 A * | 3/1998 | Kou | H01L 23/4006 257/E23.084 |
| 6,400,565 B1 * | 6/2002 | Shabbir | H01L 23/4093 257/E23.106 |
| 2008/0180915 A1 * | 7/2008 | Lin | H01L 23/427 361/704 |

FOREIGN PATENT DOCUMENTS

| | | | |
|---|---|---|---|
| GB | 2538084 A | 11/2016 |
| JP | H09287837 A | 11/1997 |
| JP | 2001304709 A | 10/2001 |
| JP | 2001304709 A1 † | 10/2001 |
| WO | 2010002245 A2 | 1/2010 |
| WO | 2010106309 A2 | 9/2010 |
| WO | 2021229149 A1 | 11/2021 |

OTHER PUBLICATIONS

Garside, J. et al., "Cryogen Free Cooling Apparatus and Method," European Application No. EP22205298.7, Filed Mar. 15, 2010, 28 pages.

"News Archive from 2019," Brown University Department of Physics Website, Available Online at https://www.brown.edu/academics/physics/news?page=14, 2019, 1 page.

"The Quest for Absolute Zero Temperature—Installation of BlueFors Dilution Fridge," Brown University Department of Physics Website, Available Online at https://www.brown.edu/academics/physics/news/2019/10/quest-absolute-zero-temperature-installation-bluefors-dilution-fridge, Available as Early as Sep. 26, 2020, 1 page.

European Patent Office, Extended European Search Report Issued in Application No. 22205298.7, Jan. 30, 2023, Germany, 7 pages.

ISA European Patent Office, Third Party Observation Issued in Application No. PCT/FI2021/050347, Observation Submitted on Behalf of Oxford Instruments Nanotechnology Tools Limited, Jul. 4, 2022, WIPO, 7 pages.

International Bureau of WIPO, International Preliminary Report on Patentability Issued in Application No. PCT/FI2021/050347, Nov. 15, 2022, WIPO, 7 pages.

Tigner, B., "A one milliKelvin top-loading dilution refrigerator and demagnetization cryostat, and, The electric field dependence of the dielectric constant in amorphous materials at ultra-low temperatures," Doctoral Dissertation, Department of Physics, Stanford University, Jan. 1994, 176 pages.

Li, Jia, "The Quest for Absolute Zero Temperature—Installation of BlueFors Dilution Fridge," Oct. 10, 2019, available at https://www.brown.edu/academics/physics/news/2019/10/quest-absolute-zero-temperature-installation-bluefors-dilution-fridge.†

Tigner, Benjamin, "A One Millikelvin Top-Loading Dilution Refrigerator and Demagnetization Crystal and the Electric Field Dependence of the Dielectric Constant in Amorphous Materials at Ultra-Low Temperatures," Stanford University, Jan. 1994.†

* cited by examiner
† cited by third party

DEVICE AND METHOD FOR PROVIDING A THERMALLY CONDUCTIVE COUPLING

CROSS REFERENCE TO RELATED APPLICATIONS

The present application is a U.S. National Phase of International Application No. PCT/FI2021/050347 entitled "DEVICE AND METHOD FOR PROVIDING A THERMALLY CONDUCTIVE COUPLING," and filed on May 11, 2021. International Application No. PCT/FI2021/050347 claims priority to Finnish Patent Application No. 20205481 filed on May 13, 2020. The entire contents of each of the above-listed applications are hereby incorporated by reference for all purposes.

TECHNICAL FIELD

The invention generally relates to cryostats in which an object being cooled may be introduced into the cryostat in such a way that heat is to be conducted therefrom to structures of the cryostat. Specifically, the invention relates to how an efficient thermally conductive coupling may be provided.

BACKGROUND

Cryostats are used for cooling objects to extremely low temperatures. In general, the object being cooled has been customarily called a sample and the place where it cools down to its lowest temperatures a target region. There are two different options for bringing the sample to the target region. In the most traditional method, the whole cryostat is warmed up and opened, the sample is manually fastened to the target region and the cryostat is closed, after which the whole cryostat with the sample is to be cooled again. For quicker sample changes it is possible to provide the cryostat with a sample changer.

FIG. 1 is a simplified diagram of a cryostat provided with a sample changer. It is a cryostat using two-stage mechanical precooling, in the innermost part of which there is a dilution refrigerator. A vacuum chamber 101 serving as the outermost part of the cryostat is indicated with broken lines. It is covered by a room temperature flange 102 to which an uppermost part 103 of the mechanical precooler is fastened. A first stage 104 of the mechanical precooler is fastened to a first cold flange 105 and a second stage 106 to a second cold flange 107. On a third cold flange 108, the still 109 of the dilution refrigerator is located. The mixing chamber 110 of the dilution refrigerator is fastened to a fourth cold flange 111. There may be couplings adjustable in thermal conductivity between the flanges, which couplings are not shown herein for the purpose of clarity. The target region 112 to which the sample will be fastened is a part of the fourth cold flange 111 or otherwise in as good thermally conductive communication with the mixing chamber 110 as possible. During operation, the temperature of the first cold flange 105 may be several tens of kelvins, the temperature of the second cold flange 107 about 4 K, of the third cold flange 108 about 1 K and the temperature of the fourth cold flange 111 only some millikelvins.

The cryostat of FIG. 1 comprises a top loader type sample changer; also solutions of a bottom loader type or those fastened to a side of the vacuum chamber are known in the prior art. The sample holder comprises a vacuum tube 113 that is fastened to a gate valve 114 of the vacuum chamber in an airtight manner. The sample, which is not shown separately in FIG. 1, is fastened to a sample holder 115 that is initially pulled-in within the vacuum tube 113. When the vacuum tube 113 has been fastened to the gate valve 114 and evacuated, the sample holder 115 may be pushed to its position in the target region 112 using a probe 116 or probes. For this purpose, all of the flanges and other structures located along its passage have to comprise coincident holes, forming a so-called clearshot.

If the sample and the sample holder 115 are at room temperature when they reach the target region 112, the heat contained therein has to be transferred out from the innermost part through the whole cryostat. This is possible but slow because, for understandable reasons, all kind of heat transfer between outside air and the innermost part of the cryostat is to be minimized during operation. In addition, the innermost cooling devices of the cryostat are the weakest in cooling power, although they are able to reach the lowest temperatures. It may be useful to seek to precool the sample and the sample holder on the way towards the target region. Mechanical contact or a thermally conductive gas may be used to form a thermally conductive coupling between the sample holder and a suitable cooling part.

FIGS. 2 and 3 illustrate a precooling principle known from patent publication EP 2409096 B1. Here the holes 201 in the flanges and the sample holder 115 are not round but are shaped in such a way that in one rotational position, the outermost parts of the sample holder 115 abut the flange adjacent to the hole 201. These parts are provided with screw holes 301. In addition to or instead of the centralized probe 116, the sample changer comprises screwable rods 202, whereby the sample holder 115 may be temporarily fastened to the flange by means of threads located at an outermost end of the screwable rods (or by means of separate bolts to be rotated with the screwable rods) as in FIG. 2. When sufficient precooling has been provided, the threads or bolts are unscrewed and the sample changer is rotated to a suitable position in which it can move through the hole 201 in the flange as in FIG. 3. The same threads or bolts may also be used for fixing the sample holder 115 in the target region.

There are several disadvantages in the solution according to FIGS. 2 and 3. Firstly, it limits the design of the sample holder and makes machining the holes in the flanges more complicated. Secondly, the friction caused by tightening of the threads or bolts has to be considered. Because specific heat capacity of metals and other solids when they are cold is very low, even a small quantity of heat generated by the friction may be enough to warm up the objects interacting with it by several degrees. The structure is also highly dependent on physical dimensions of the mechanical objects, which dimensions become smaller when the temperature decreases. The requirement of mechanical compatibility may cause problems for the operability of the mechanism, as cooling down changes the dimensions of the objects.

Use of thermally conductive springs is also known in the prior art, which is illustrated in FIGS. 4 and 5. A sample 401 is fastened to a sample holder 115 that is in this case substantially disc-shaped and manufactured from a material having good thermal conductivity. A plurality of springs 402, the material of which is both elastic and thermally conductive, are fastened around a hole in the flange 105. When the sample holder 115 is pushed between the springs in accordance with FIG. 5, they yield outwards and are pressed under their spring force against edges of the sample holder 115.

As for disadvantages of the solution according to FIGS. 4 and 5, at least for the present no material which would be sufficiently elastic and the thermal conductivity of which would at the same time be sufficiently high is known. Good elasticity is necessary, because when two solid objects contact each other, the thermal conductivity significantly depends on the magnitude of the force pressing them towards each other. Copper is a good example of a material having good thermal conductivity but not yielding very much: if copper tabs were used as the "springs", they would bend to their outer position at first use and would not return, whereby all subsequent precooling attempts would fail due to insufficient contact. On the other hand, from a beryllium-copper alloy it is possible to obtain springs maintaining their properties well, but its thermal conductivity is so low that the springs have to be coated for example with gold or silver. The coating, however, will inevitably be so thin that the combined cross-sectional surface having good thermal conductivity between the sample holder 115 and the flange 105 will be relatively small.

SUMMARY

It is an object of the present invention to present a device and a method with which the cooling of an object being introduced into a cryostat is efficient. It is also an object of the invention that the device and the method as presented wear well without losing efficiency even after several uses. It is additionally an object of the invention that they are applicable to many different sizes and shapes of objects being cooled. It is a further object of the invention that it is possible to manufacture the required device parts from generally available materials and using conventional machining methods.

The objects of the invention are achieved by using in the structure a heat transfer section and a separate spring section, the elasticity of which forces the heat transfer section into good contact with the object being cooled.

A device according to the invention for providing a thermally conductive coupling in order to cool an object being moved within a cryostat comprises:

- a heat transfer section forming a contact surface for said object.
- means for fastening the heat transfer section to a cooling structure in such a way that said contact surface remains free and
- a spring section which is separate from said heat transfer section and which is arranged to exert on the heat transfer section a spring force pushing said contact surface in that direction in which it is intended to contact said object.

According to one embodiment, the heat transfer section comprises a plurality of heat transfer elements arranged in the form of a ring, whereby said contact surface is formed by those surfaces of the heat transfer elements which face towards the interior of the ring. In some embodiments, a large part of the outer surface of the object being moved within the cryostat may be harnessed for the needs of heat transfer.

According to one embodiment, said spring section comprises one or more spring elements disposed outside of said heat transfer elements arranged in the form of a ring and pushing the heat transfer elements towards the centre of the ring. As such, the pressing force needed for efficient heat transfer may be exerted symmetrically on the object being moved within the cryostat.

According to one embodiment, the device comprises means for supporting said spring section to said cooling structure, meaning that controlling the magnitude and direction of the spring force being provided will be simple.

According to one embodiment, said heat transfer section comprises a fastening ring having an inner edge, and a plurality of heat transfer tabs which are fastened at one end to the inner edge of the fastening ring and another, free end of which is directed in a substantially perpendicular direction to a plane defined by the fastening ring. As such, manufacturing the heat transfer section to the exact desired size and shape will be easy.

According to one embodiment, said spring section comprises a support ring fastened on top of said fastening ring and having an inner surface, and a plurality of spring tabs supported to the inner surface of said support ring and arranged to exert on said heat transfer tabs said spring force. As such, the spring force can be exerted on the heat transfer section in a desired manner.

According to one embodiment, said spring tabs form a continuous band of spring tabs extending around the inner surface of said support ring, which band of spring tabs is supported to one or more grooves at the inner surface of said support ring. This provides a manufacturing technology advantage in the manufacture of the spring section.

According to one embodiment, the device further comprises an upper fastening ring fastened on top of said support ring and arranged to support the free end of each of said heat transfer tabs in a position located farther away from the centre line of the ring formed by the heat transfer tabs than the centre of the heat transfer tabs. The position of the heat transfer tabs is particularly good for the movement of the object being moved within the cryostat.

According to one embodiment, said heat transfer section is manufactured from copper or silver, meaning that the thermal conductivity of the heat transfer section is high.

According to one embodiment, the heat transfer section manufactured from copper or silver is coated with gold, meaning that the relevant surfaces of the heat transfer section are not oxidized and that they maintain a good thermal conductivity for a long time.

According to one embodiment, said spring section is manufactured from a beryllium-copper alloy, meaning that the elastic properties of the spring section are well-suited for use in an environment containing very low temperatures, as in a cryostat.

An arrangement according to the invention for cooling an object being moved within a cryostat comprises a cooling structure and a device which is in accordance with any of the descriptions given above attached thereto.

According to one embodiment, the arrangement comprises a first cooling structure and a first device which is in accordance with the description given above attached thereto. The arrangement may in this case comprise a second cooling structure and a second device, which is also in accordance with any of the descriptions given above, attached thereto. The first cooling structure may comprise an opening that is concentric with said first and second device. In said first device a contact surface of the device may form a ring having a first diameter. In said second device a contact surface of the device may form a ring having a second diameter that is smaller than the first diameter. A diameter of said opening may be larger than said first and second diameter. As such, the object being moved within the cryostat may comprise two parts of a different diameter, both of which parts are arranged to correspond to heat transfer via a specific device.

According to one embodiment, said second cooling structure forms a target region for fastening the object being cooled in the cryostat. At this location the heat transfer serves refrigeration of the object as cold as possible.

According to one embodiment, the arrangement comprises a sample holder that forms at least a part of said object being moved within the cryostat. The sample holder may in this case comprise a first section that is in diameter compatible with said first diameter, and a second section that is in diameter compatible with said second diameter. Said second section may be arranged in that part of the sample holder which is located, in relation to the first section, towards the same direction as said second cooling structure in located in relation to said first cooling structure. As such, the second section remains scratch-free in the previous cooling stages and is as scratchless as possible when being used in the cooling stage intended therefor.

DETAILED DESCRIPTION

Figure 6:
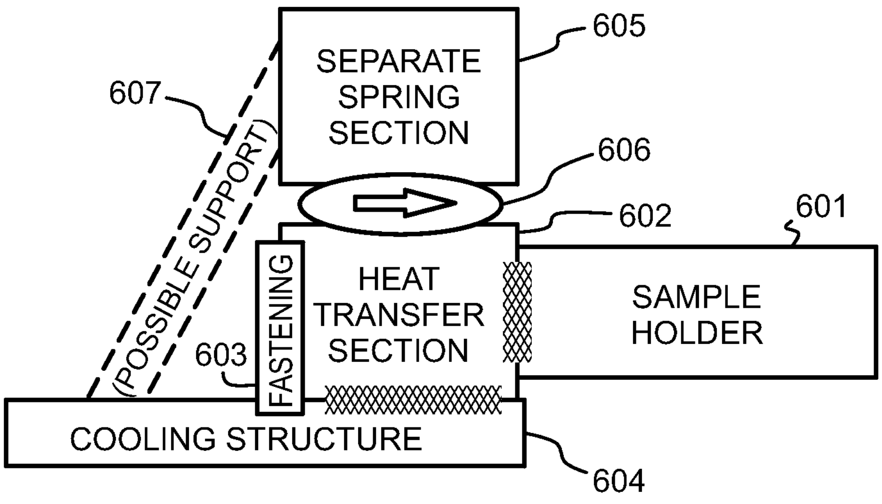
FIG. 6 illustrates a principle of efficient precooling.

FIG. 6 is a diagram of the principle of a device for providing a thermally conductive coupling when the purpose is to cool an object 601 being moved within a cryostat. The object 601 being moved is in FIG. 6 referred to as a sample holder, but it may also be some other object being moved. The actual purpose may be to move and cool some other item, for example a sample fastened to the sample holder. However, in practice such item being moved indirectly (such as the sample) and the item being used for moving it (such as the sample holder) may generally be considered as one object 601 being moved within the cryostat.

According to the principle illustrated in FIG. 6, the device comprises a heat transfer section 602 forming a contact surface for the object 601. The purpose is thus that the object 601 being moved and the heat transfer section 602 are brought into physical contact with each other, whereby the heat may be transferred therebetween by conduction from one solid object to the other. The thermally conductive coupling based on a physical contact between the objects is illustrated by crosshatching in FIG. 6. The heat transfer section 602 may consist of one or more pieces.

According to the principle illustrated in FIG. 6, the device comprises means 603 for fastening the heat transfer section 602 to a cooling structure 604. This fastening is specifically provided in such a way that the contact surface of the heat transfer section 602 intended to make contact with the object 601 being moved remains free. The last mentioned condition is natural in the sense that if the contact surface was not free, it could be difficult or impossible to bring the object 601 being moved into a thermally conductive contact with the heat transfer section 602. Between the heat transfer section 602 and the cooling structure 604 there is a thermally conductive coupling illustrated in FIG. 6 by crosshatching.

According to the principle illustrated in FIG. 6, the device comprises a spring section 605 which is separate from the heat transfer section 602 and which is arranged to exert on the heat transfer section 602 a spring force 606. The spring force 606 pushes the contact surface of the heat transfer section 602 in that direction in which it is intended to contact the object 601 being moved.

The separation of the spring section 605 from the heat transfer section 602 means that—in contrast to the prior art—the thermal conduction between the object 601 and the cooling structure 604 and the force maintaining the thermally conductive contact are not attempted to be provided with the same structural element. The separation does not mean that the spring section 605 and the heat transfer section 602 should be located in complete separation from each other, in different parts of the structure. It means that the spring section 605 may be one piece (or a plurality of pieces) and the heat transfer section 602 may be another piece (or a plurality of other pieces). The piece or the pieces which form the spring section 605 may be manufactured from a different material than that other piece or those other pieces which form the heat transfer section. This is even advisable, because these sections are required to have very different properties: the most important property of the heat transfer section 602 is thermal conduction as efficiently as possible between the object 601 being moved and the cooling structure 604, whereas the most important property of the spring section 605 is to provide a good spring force 606.

The spring section 605 may be supported to the cooling structure 604, as illustrated in FIG. 6 by reference number 607. However, this is not necessary. Examples of both supported and unsupported embodiments are described in more detail below.

Figure 7:
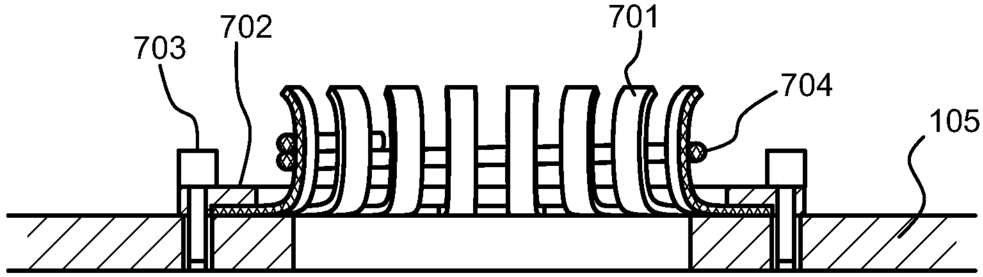
FIG. 7 illustrates one embodiment for performing precooling.

FIG. 7 illustrates a device according to one embodiment for providing a thermally conductive coupling in order to cool an object being moved within a cryostat. The device being moved is not illustrated in FIG. 7, but it may be assumed to be for example the same type of round disk as above in the description of the prior art and in FIGS. 4 and 5. The cooling structure is one flange 105 of the cryostat. Thus, it is assumed herein that some cooling device such as, for example, some stage of a mechanical precooler of the cryostat or a dilution refrigerator still is coupled in a thermally conductive manner to the flange 105 (outside the area illustrated in FIG. 7). The flange 105 is provided with a round opening through which the object being moved is intended to be carried. If the object being moved is a sample holder intended to be carried to the target region, the opening in the flange 105 is part of the clearshot used for this purpose.

The heat transfer section of the device illustrated in FIG. 7 comprises a plurality of heat transfer elements 701 arranged in the form of a ring. In shape, the heat transfer elements 701 resemble the thermally conductive springs used in the solutions according to the prior art. However, the difference is that in the embodiment illustrated in FIG. 7, they are not required to have any kind of elasticity. The heat transfer elements 701 may be manufactured for example from copper, whereby their bending is relatively easy but they have a natural tendency to maintain that position into which they were bent.

In the embodiment according to FIG. 7, there are also means for fastening the heat transfer section to the cooling structure. These means comprise a fastening ring 702 and screws 703 fastening the fastening ring 702 to the flange 105. An outermost end of each heat transfer element 701 is tightly pressed between the fastening ring 702 and the flange 105. This ensures that a good thermally conductive coupling is maintained between the heat transfer elements 701 and the flange 105 operating as the cooling structure.

The contact surface of the heat transfer section intended for the object being moved within the cryostat is formed by those surfaces of the heat transfer elements 701 which face towards the interior of the ring formed thereby. By comparing FIG. 7 with FIGS. 4 and 5 it is easy to understand how for example a disc-shaped sample holder would be pushed to the centre of the ring formed by the heat transfer elements 701 in such a way that its cylindrical outer surface would simultaneously contact each of the heat transfer elements 701.

Figure 8:
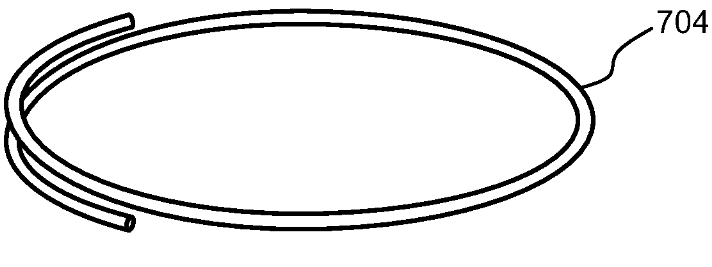
FIG. 8 illustrates one element of a solution of FIG. 7.

In the embodiment illustrated in FIG. 7 the spring section of the device comprises a spring element 704 disposed outside of the heat transfer elements 701 arranged in the form of a ring and pushing the heat transfer elements 701 towards the centre of the ring. The spring element 704 is illustrated separately in FIG. 8. It is annular and manufactured from spring steel, a beryllium-copper alloy or other corresponding material maintaining its elasticity also at the cold temperature of the cryostat.

The spring element 704 is sized in such a way that at rest (when the object being moved is not in contact with the heat transfer elements 701) it presses the circular contact surface formed collectively by the heat transfer elements 701 to a smaller diameter than the opening in the flange 105 (and thus also to a smaller diameter than the diameter of the object being moved intended to be cooled). Then, as the object being moved is pushed to the centre of the ring, it forces the free ends of the heat transfer elements 701 outwards, bending each heat transfer element 701 at the point where the vertical portion of the heat transfer element changes into a horizontal portion. The terms referring to directions such as vertical and horizontal refer throughout this text to the mode of presentation used in the figures and they do not have any limiting effect on how the corresponding parts are directed in an actual device.

The spring force generated by the spring element 704 resists the above-described bending of the heat transfer elements 701. This creates a force pushing the heat transfer elements 701 strongly against the surface of the object being moved within the cryostat, whereby thermal conduction between these parts is efficient. Then, as the object being moved is transferred away from the centre of the ring formed by the heat transfer elements 701, the spring element 704 presses the heat transfer elements 701 back to that position in which they were before the introduction of the object being moved. Thus the device for providing a thermally conductive coupling as shown in FIG. 7 is ready for the next time when an object being moved within the cryostat has to be cooled at the device.

Figure 9:
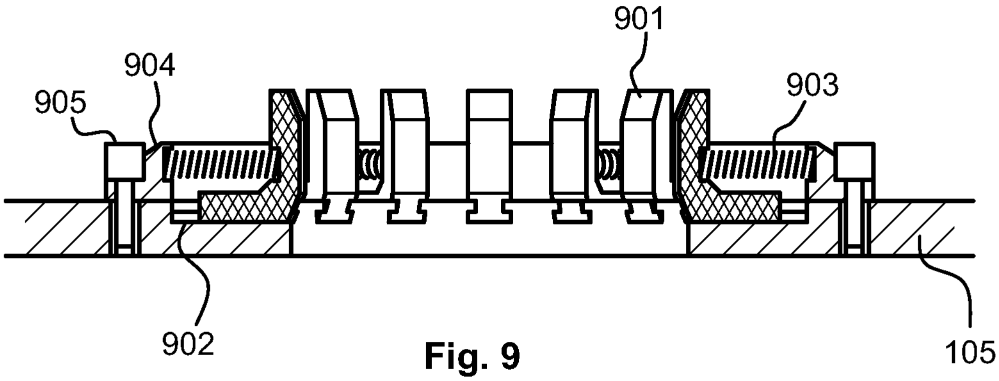
FIG. 9 illustrates one embodiment for performing precooling.

FIG. 9 illustrates a device according to another embodiment for providing a thermally conductive coupling in order to cool an object being moved within a cryostat. In the device of FIG. 9 the heat transfer section forming a contact surface for said object consists of a plurality of heat transfer elements 901 arranged in the form of a ring. The contact surface is formed also in this case by those surfaces of the heat transfer elements 901 which face towards the interior of the ring. The heat transfer elements 901 are manufactured from a material that is highly thermally conductive at the operating temperatures of the cryostat, such as copper or silver. They may additionally be coated with a coating improving the heat transfer properties such as a layer of gold.

One of the flanges 105 of the cryostat is also in this case illustrated as the cooling structure. In the embodiment of FIG. 9 the means for fastening the heat transfer section to the cooling structure consist of slide rails 902, one for each heat transfer element 901. Each heat transfer element 901 is installed at the corresponding slide rail in such a way that it is able to easily move in a radial direction of the ring formed by the heat transfer elements 901. If necessary, the portion of the heat transfer element 901 located inside the slide rail 902 and/or the slide rail itself may be coated with a coating having both good thermal conduction properties and low friction at temperatures corresponding to the operation of the cryostat.

According to the principle described above, in the embodiment of FIG. 9 there is a spring section which is separate from the heat transfer section. The spring section is arranged to exert on the heat transfer section a spring force pushing the contact surface of the heat transfer section in that direction in which it is intended to contact the object being moved within the cryostat. In the embodiment of FIG. 9 the spring section comprises a plurality of spring elements 903 disposed outside of the heat transfer elements 901 arranged in the form of a ring. Specifically, in this embodiment the number of the spring elements 903 is equal to that of the heat transfer elements. A spring element corresponding to each heat transfer element 901 pushes it towards the centre of the ring. The spring elements 903 are compression springs manufactured from spring steel, a beryllium-copper alloy or other corresponding material maintaining its elasticity also at the cold temperature of the cryostat.

Unlike in the embodiment of FIG. 7, in the embodiment of FIG. 9 there are means for supporting the spring section to the cooling structure. These means comprise a fastening ring 904 and bolts 905 fastening the fastening ring 904 to the flange 105. The inner surface of the fastening ring 904 is most preferably provided with a recess for the end of each spring element 903 so that the spring elements 903 stay in their place and in a correct direction.

Figure 10:
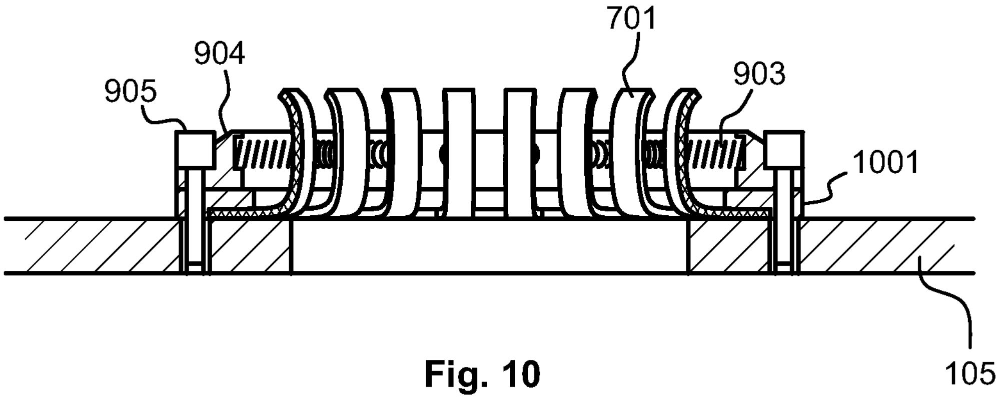
FIG. 10 illustrates one embodiment for performing precooling.

Compared to FIG. 7, the heat transfer elements 901 embodied in FIG. 9 are not subjected to constant back-and-forth bending, whereby they do not show metal fatigue and fractures possibly caused thereby. On the other hand, a disadvantage of the embodiment of FIG. 9 is friction which inevitably occurs in the slide rails 902 and which may generate detrimental amounts of heat, and thermal conductivity of the slide rail mechanism that may be lower than that of the pressure connections of FIG. 7. If the metal fatigue is not a significant problem, it is possible to combine the principles illustrated in FIGS. 7 and 9 for example in the manner illustrated in FIG. 10. In the embodiment illustrated in FIG. 10, the heat transfer elements 701 are similar to those of FIG. 7, but the spring section consists of similar spring elements 903 as in FIG. 9. The fastening means comprise, in addition to the fastening ring 904 and the bolts 905, an elevation ring 1001 that is specifically designed to press the horizontal ends of the heat transfer elements 701 against the flange 105. Naturally, a single common ring that combines the properties of the rings 904 and 1001 illustrated in FIG. 10 may also be used.

Yet one possible modification of the embodiment of FIG. 9 is one in which hinges are used instead of the slide rails 902. At the base of the vertical portion of each heat transfer element 901 there would thus be a hinge tangential to the ring and having a horizontal rotation axis, on which hinge the vertical portion could rotate towards and away from the centre of the ring. Hinges are more complex as a structure than slide rails and require more individual parts and work in the assembly stage, but with hinges it is possible to achieve lower friction and thereby more reliable operation and lower excessive heat generation than with slide rails.

Figure 11:
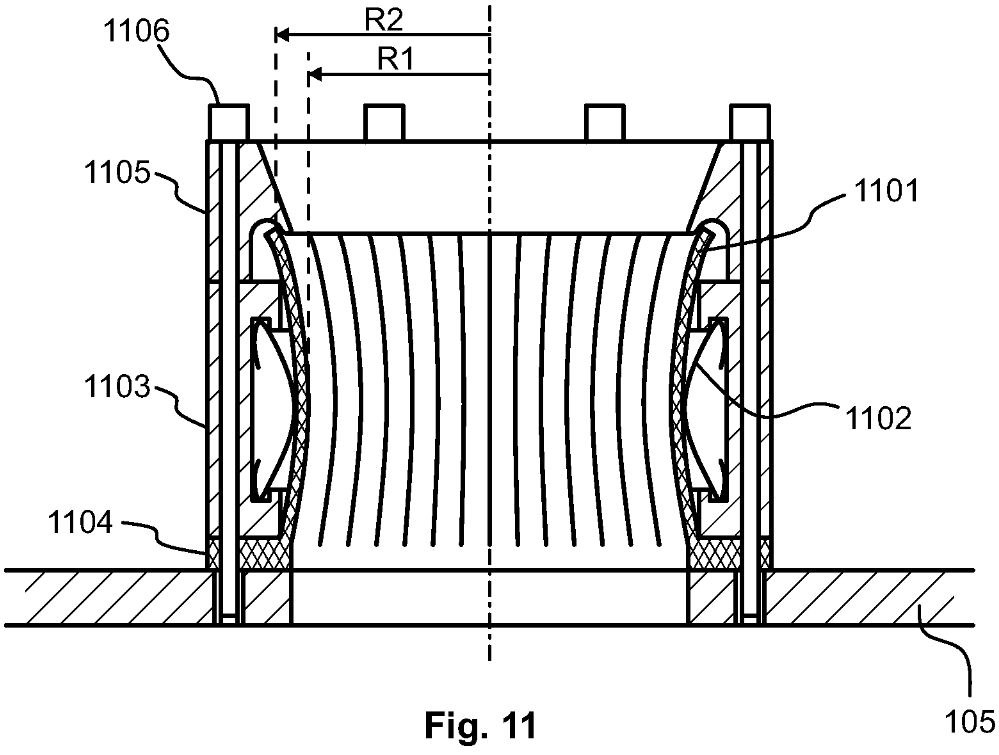
FIG. 11 illustrates one embodiment for performing precooling and FIG. 12 illustrates a further elaboration of the embodiment of FIG. 11.

FIG. 11 illustrates a device according to one embodiment for providing a thermally conductive coupling in order to cool a device being moved within a cryostat. The embodiment of FIG. 11 is similar to those described above in that the device comprises a heat transfer section, means for fastening it to a cooling structure (for example, flange 105 in FIG. 11) and a spring section which is separate from the heat transfer section. The heat transfer section forms a contact surface for the object being moved within the cryostat in order to be cooled. The fastening to the cooling structure is such that this contact surface remains free. The spring section is arranged to exert on the heat transfer section a spring force pushing the contact surface in that direction in which it is intended to contact said object.

As in the other embodiments described above, it is assumed in FIG. 11 that the object being cooled is, at least in some part thereof, cylindrical and intended to be moved up and down through an opening in the flange 105. The heat transfer section comprises a plurality of heat transfer elements 1101 arranged in the form of a ring, which in this embodiment may also be referred to as heat transfer tabs. The contact surface is formed by those surfaces of the heat transfer tabs 1101 which face towards the interior of the ring. The spring section comprises a plurality of spring elements 1102 disposed outside of the heat transfer tabs 1101 arranged in the form of a ring and pushing the heat transfer tabs 1101 towards the centre of the ring. The device also comprises means for supporting the spring section to the cooling structure. These means comprise rings 1103, 1104 and 1105 and bolts 1106, the structure and operation of which is explained in more detail below.

The heat transfer section of the device according to the embodiment of FIG. 11 comprises a fastening ring 1104. The dimensions of the inner edge thereof may be approximately of the same order as those of the opening in the flange 105, but they may also be larger or smaller. The heat transfer tabs 1101 are fastened at one end to the inner edge of the fastening ring 1104. Another, free end of the heat transfer tabs 1101 is directed in a substantially perpendicular direction to a plane defined by the fastening ring 1104. In the position illustrated in FIG. 11, the free end of the heat transfer tabs 1101 is thus directed upwards.

The unit formed by the heat transfer tabs 1101 and the fastening ring 1104 may be manufactured from a material conducting heat as well as possible at the relatively low temperatures relating to the normal operation of the cryostat. Such materials include, for example, copper and silver. In addition, the heat transfer tabs 1101 and the fastening ring 1104 may be coated with gold and/or provided with other such coating or surface treatment which improves their ability to form a thermally conductive coupling with those parts with which they are in contact. Specifically the contact surface formed by those surfaces of the heat transfer tabs 1101 which face towards the interior of the ring should be made rather hard, so it would not be scratched by the repeated sliding contacts with the object being cooled.

The heat transfer tabs 1101 may be manufactured by cutting, from a material sheet of a suitable thickness, a comb-shaped part, the length of which corresponds to the circumference of the inner edge of the fastening ring 1104. The continuous edge of the comb-shaped part may be fastened around the inner edge of the fastening ring 1104 using a suitable metal joining method such as welding or soldering.

The spring section of the device according to the embodiment of FIG. 11 comprises a support ring 1103 fastened on top of the fastening ring 1104. The spring elements of the spring section are a plurality of spring tabs 1102 supported to the inner surface of the support ring 1103 and arranged to exert on the heat transfer tabs 1101 the spring force pushing them towards the centre of the ring formed by the heat transfer tabs 1101.

The spring tabs 1102 may be separate or they may form a continuous band of spring tabs extending around the inner surface of the support ring 1103, which band of spring tabs is supported to one or more grooves at the inner surface of the support ring 1103. Instead of the spring tabs 1102, coil springs as in the embodiments of FIGS. 9 and 10 or a spring ring as in the embodiment of FIG. 7 may be used.

The spring tabs 1102 or other spring elements used instead are manufactured from a material maintaining its elasticity at the low temperatures which are normal in the operation of a cryostat. Examples of such materials are many spring steels and beryllium-copper alloys.

There may be a different number of heat transfer tabs 1101 and spring tabs 1102. In some embodiments, the dimensions of both the heat transfer tabs 1101 and the spring tabs 1102 may thus be optimized according to their different function (heat transfer/generation of spring force): for example, the heat transfer tabs 1101 may not be made very narrow in relation to their length, as in a narrow tab there would be less heat transferring cross-sectional area. Additionally, when there is a different number of heat transfer tabs 1101 and spring tabs 1102, their vertical edges will not coincide, at least not at many points. This may help causing, at each point, the adjacent heat transfer tabs 1101 to be pressed against the object intended to be cooled at a force that is as constant as possible. Further, it may be mentioned that when the number is not so important that the elements should be manufactured specifically for this purpose to begin with, it may be possible to use parts that are more easily accessible due to their application in other connections as well.

In addition to the above described parts, the device according to the embodiment of FIG. 11 comprises an upper fastening ring 1105 fastened on top of the support ring 1103 and arranged to support the free end of each of said heat transfer tabs 1101 in a position located farther away from the centre line of the ring formed by the heat transfer tabs 1101 than the centre of the heat transfer tabs (R2>R1 in FIG. 11). Together with the spring tabs 1102, the upper fastening ring 1105 thus ensures that each heat transfer tab 1101 is bent to a curve in such a way that the object being moved within the cryostat is easily moved to the centre of the ring formed by the heat transfer tabs 1101 from either direction. The upper fastening ring 1105 is not necessary, if the object being moved has sufficiently conical contours for opening the ring formed by the heat transfer tabs 1101 and/or the free end of each heat transfer tab 1101 can otherwise be kept bent to a sufficient degree away from the centre line of the ring.

Fastening bolts 1106 extend in the embodiment illustrated in FIG. 11 through the fastening ring 1104, the support ring 1103 and the upper fastening ring 1106. This is not necessary per se, but each of the rings may be fastened to the underlying structure with their own, in the case of rings 1104 and 1103 countersunk, bolts or by other suitable manner.

In general terms, it may be stated that every time the object being moved within the cryostat slides in contact with some other part (such as the contact surface of a device used for cooling it), the surfaces contacting each other may be scratched and wear. This effect reoccurs substantially similarly, regardless of the technical implementation of the device used for the cooling, although in different implementations the amount of scratching and wearing may vary. All scratching and wearing is unwanted, because it may weaken the thermal conduction between the object being cooled and the contact surface of the device used for cooling it.

In some embodiments, the thermally conductive coupling through which the sample is cooled to the lowest temperatures in the target region. However, if the same manner of thermally conductive coupling is also applied at those locations where the sample (or generally: sample holder) is precooled before it reaches the target region, they may cause the very scratching and wearing that should be avoided.

One object is thus to present an arrangement by which a thermally conductive coupling that is as good as possible for cooling an object being moved within a cryostat could be ensured in a target region, although it may also be precooled in other parts of the cryostat before it reaches the target region.

This object is achieved in such a way that when the object being moved within the cryostat has arrived at the target region, a different kind of thermally conductive coupling is formed between the object and the cooling structure than the one used for precooling the object being moved.

Figure 12:
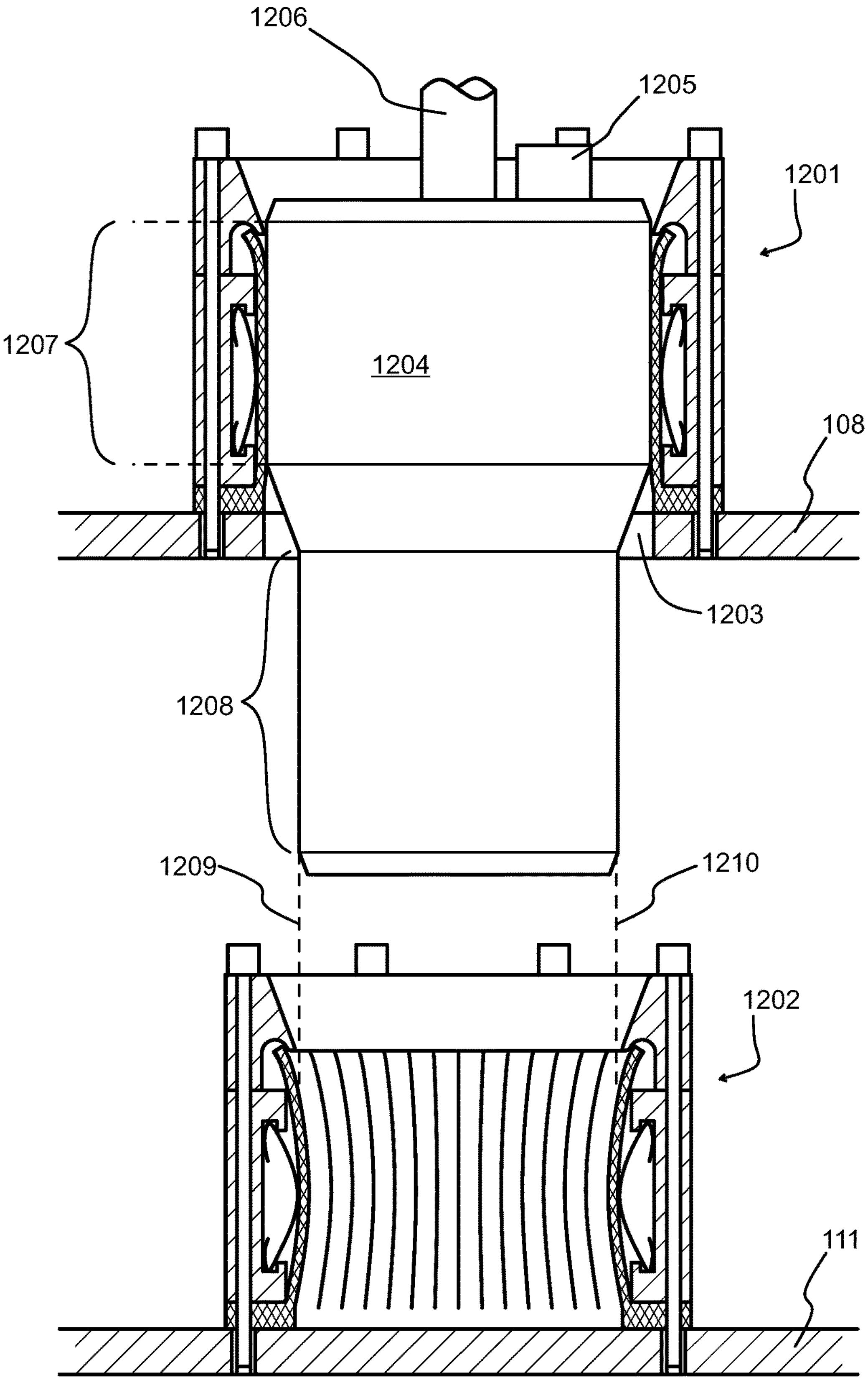

FIG. 12 illustrates an example of an arrangement for cooling an object being moved within a cryostat. The arrangement comprises a first cooling structure (here: flange 108) and a first device 1201 fastened thereto, which is herein illustrated substantially as in FIG. 11 but which may be a device according to any of the embodiments described above. The arrangement comprises a second cooling structure (here: flange 111) and a second device 1202 fastened thereto. It is also illustrated herein substantially as in FIG. 11, but also the second device 1202 may be in accordance with any of the embodiments described above. The first cooling structure, i.e. flange 108, comprises an opening 1203 that is concentric with the first device 1201 and the second device 1202.

What is specific to the arrangement according to FIG. 12 is that the first device 1201 and the second device 1202 are not exactly the same size. In the first device 1201 a contact surface of the device forms a ring having a first diameter. In the second device 1202 a contact surface of the device forms a ring having a second diameter. The second diameter is smaller than the first diameter. According to one embodiment, the second cooling structure 111 forms a target region to which the object being cooled in the cryostat is intended to be fastened. Thus, the circular contact surface in that device which is located in the target region is smaller in diameter than in that or those devices which is or are used for precooling the object before it reaches the target region.

The object being moved within the cryostat is illustrated in FIG. 12, which object is in this case a sample holder 1204. In specific terms, the sample holder 1204 forms only a part of the object being moved within the cryostat, because in this example there is a sample 1205 fastened to the sample holder 1204 and a probe 1206 moving with the sample holder. The sample holder 1204 comprises a first portion 1207 that is in diameter compatible with said first diameter, i.e. the diameter of the contact surface of the first device 1201. In addition, the sample holder 1204 comprises a second portion 1208 that is in diameter compatible with said second diameter, i.e. the diameter of the contact surface of the second device 1202.

The compatibility between the diameter of the portion in the sample holder 1204 and the corresponding diameter of the contact surface of the device used for the cooling is illustrated by a comparison in which the first device 1201 is compared with the second device 1202 in a situation shown in FIG. 12. The sample holder 1204 is situated at a point where the first device 1201 is used for cooling it. The larger-diameter portion 1207 of the sample holder 1204 is pressed against the contact surface of the first device 1201. According to the principle described above, this means that the heat transfer tabs in the first device 1201 are pushed outwards from the so-called rest position in which they would lie if the sample holder 1204 was not situated at them. The diameter of the first portion 1207 of the sample holder 1201 is thus not equal to the smallest diameter of the contact surface of the first device 1201 in the rest position, but is slightly larger—however, only to a degree that the sample holder 1201 can move through the first device when it pushes the heat transfer tabs outwards as illustrated in FIG. 12.

Important quantities in terms of heat transfer are the force by which the thermally conductive surfaces are pressed against each other, but also the area via which they contact each other. FIG. 12 shows how the heat transfer tabs of the first device 1201 have been pushed to a position where a large part of the length of each heat transfer tab is in contact with the larger-diameter portion 1207 of the sample holder. Such operation may be achieved by sizing the structures precisely. Mechanical simulation may be used as a help, simulating the deformations of the heat transfer tabs and of the spring tabs pushing them by the effect of such a force that pushes them outwards.

Correspondingly, the diameter of the second portion 1208 of the sample holder 1201 is not equal to the smallest diameter of the contact surface of the second device 1202 in the rest position, but is slightly larger. This is illustrated in FIG. 12 by vertical dashed lines 1209 and 1210 drawn from the lower edge of the second portion 1208 towards the heat transfer tabs of the second device 1202. If the sample holder was moved down from the position illustrated in FIG. 12 to a distance where the second portion 1208 is located at the second device 1202, the heat transfer tabs of the second device 1202 would assume a similar position as the heat transfer tabs of the first device 1201 in FIG. 12. The heat transfer tabs of the first device 1201 would naturally return to their rest position under pressure of the spring tabs of the first part 1201 immediately when the first portion 1207 of the sample holder 1204 would have been withdrawn from them.

The opening 1203 in the cooling structure 108 is in diameter larger than the diameter of either of the portions 1207 or 1208 of the sample holder 1204. This condition is provided because the sample holder 1204 is not intended to touch the edges of the opening 1203 at any stage but just move smoothly through it.

The sample holder 1204 moves on to the target region with the second portion 1208 moving first. For the above-described operation to be possible, the second portion 1208 thus has to be arranged in that part of the sample holder 1204 which is located, in relation to the first portion 1207, towards the same direction as the target region (or generally: the second cooling structure 111) is located in relation to the first cooling structure 108. Upon reaching the target region, the second portion 1208 has not yet contacted any previous part and especially has not slid along any previous contact surface, so it is completely scratch-free and unworn. Although every change of the sample naturally causes two sliding movements between the second portion 1208 and the contact surface of the second device 1202 (one when introduced to the target region, another when removed from it), there will be, however, a substantially smaller amount of these sliding movements in total than if the same portion of the sample holder would also slide against all the precooling contact surfaces during introduction as well as removal.

Figure 1:
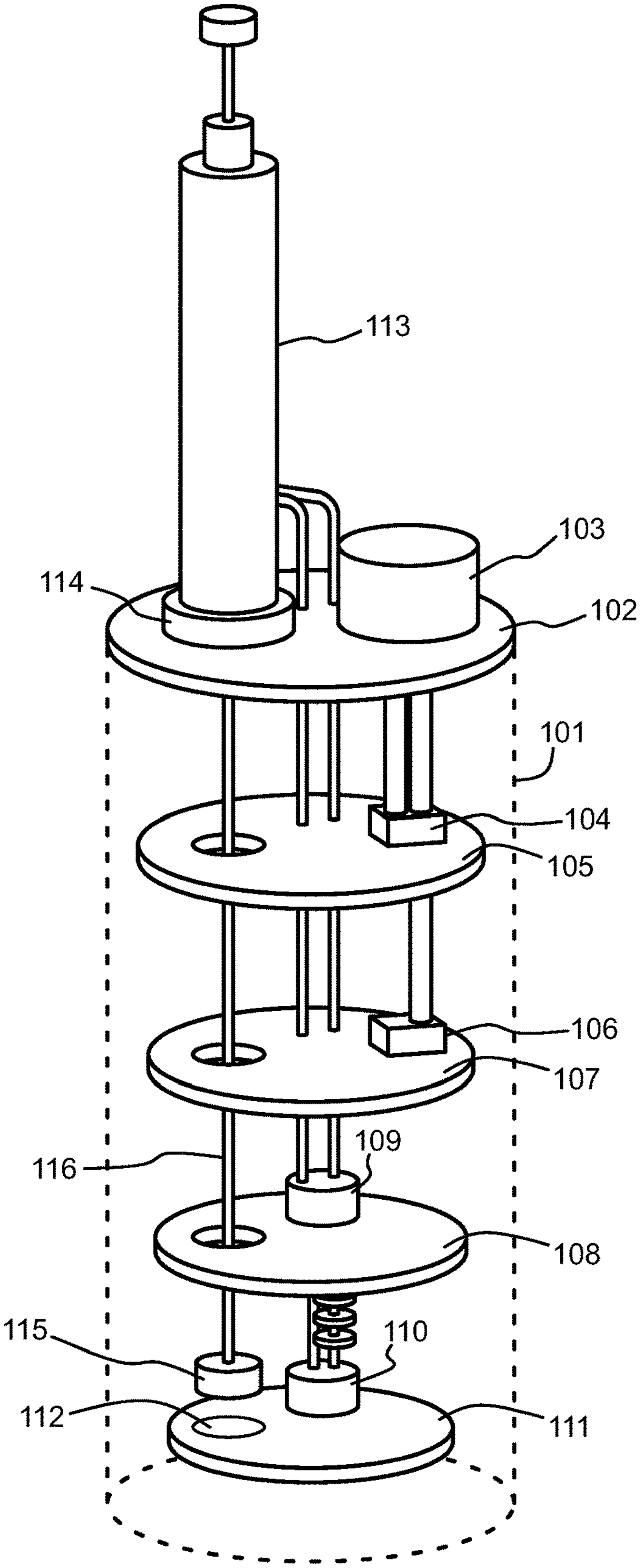
Fig. 1 PRIOR ART
FIG. 1 illustrates a cryostat.
Figure 2:
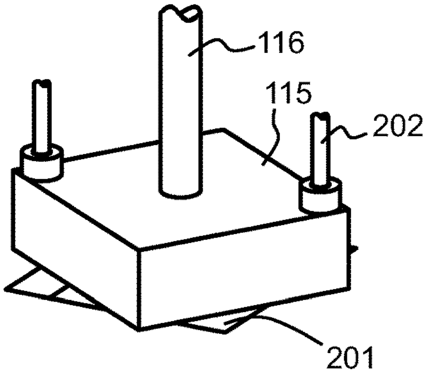
Fig. 2 PRIOR ART
FIG. 2 illustrates one known precooling solution.
Figure 3:
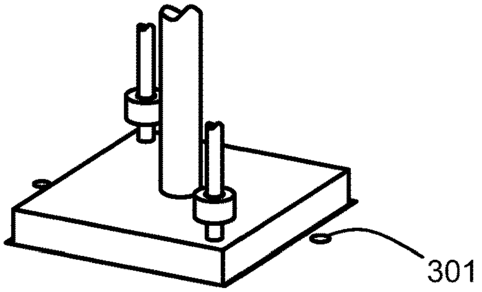
Fig. 3 PRIOR ART
FIG. 3 illustrates a later stage in use of the solution according to FIG. 2.
Figure 4:
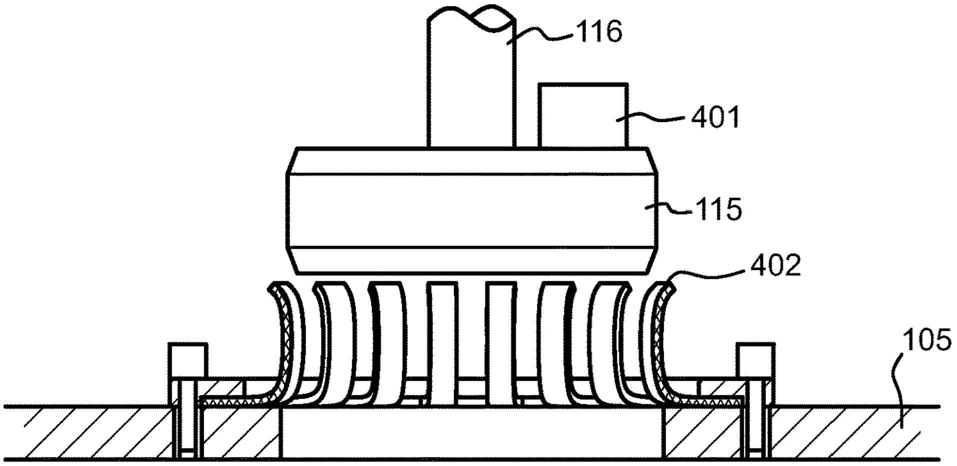
Fig. 4 PRIOR ART
FIG. 4 illustrates one known precooling solution.
Figure 5:
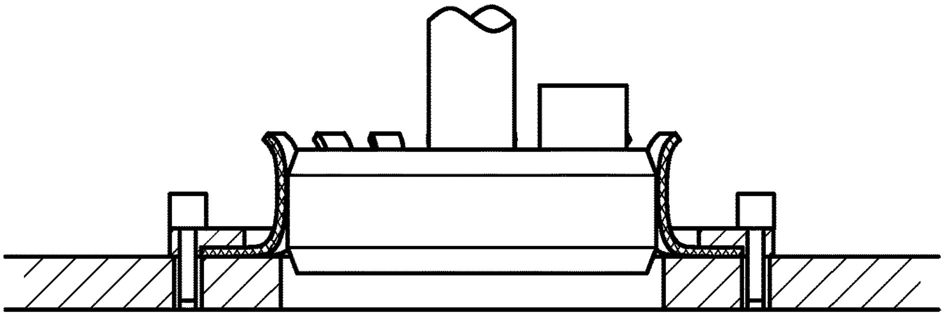
Fig. 5 PRIOR ART
FIG. 5 illustrates a later stage in use of the solution according to FIG. 4.

When comparing the device according to the embodiments described herein for example with the arrangement according to the prior art illustrated in FIGS. 4 and 5, one significant factor is the thermally conductive cross-sectional area. In the arrangement according to the prior art the springs 402 were typically of a beryllium-copper alloy coated with gold. The thermal conductivity of a beryllium-copper alloy at cryogenic temperatures is so low that heat was conducted from the sample holder 115 to the flange 105 almost entirely by the gold coating of the springs. Its thickness was typically only some micrometres, whereas in the devices according to FIGS. 7 and 9-12 the heat transfer elements may be of solid, well thermally conductive copper and, also in the tab-shaped embodiments, in thickness for example from a half to one millimetre. It is clear that the thermally conductive cross-sectional area thus becomes even hundreds of times larger than in the solution according to the prior art.

The embodiments described herein have several features related to providing the thermally conductive coupling from the sides of the sample holder or another object being moved within a cryostat. One of them is insensitivity to the dimensional changes caused by temperature variations. When for example the probe shortens when cooling down, it moves the sample holder in the same direction in which the sample holder would in any case move. This does not significantly change the quality of the thermally conductive coupling or the mechanical compatibility between the parts in the embodiments presented above. The sample holder may be provided with a rather wide, substantially even surface (lower surface in FIG. 12) that is entirely available for other purpose than that of providing thermally conductive couplings. The surface may be provided for example with connectors intended for transmitting electronic signals, which connectors are pushed into matching parts in the target region when the sample holder arrives at the target region.

The above-described example embodiments are not intended to be limiting, but it is possible to implement many features of the device and the arrangement in other ways as well. For example, nothing requires that either the device or the sample holder should be rotationally symmetrical. The same principle as described above may well be applied for example in such an arrangement where the sample holder and the openings of the clearshot are oval, quadrilateral or shaped as some other polygon. In such arrangement the device for providing a thermally conductive coupling would thus not form a rotationally symmetrical contact surface, but the contact surface could be formed for example by those surfaces of the heat transfer elements, disposed in a straight line on each of the four sides of a quadrilateral opening, which face towards the opening. Another example of extension beyond just the embodiments presented above is that the object being moved within the cryostat does not always have to be a sample holder. Applying the same principle, for example a thermal switch, i.e. a controllable means for regulating thermal conduction between two parts of a cryostat, may be constructed. The object being moved may be in thermally conductive communication with a first part and the device according to any of the embodiments discussed above may be fastened to a second part. By using some mechanism controlled from outside of the cryostat, the object being moved may be moved selectively either into contact with the contact surface of the device or out of it. In this case, it is thus selected whether these two parts of the cryostat are in thermally conductive communication with each other or not.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A device for providing a thermally conductive coupling in order to cool an object being moved within a cryostat, the device comprising:
- a heat transfer section forming a contact surface for said object,
- means for fastening the heat transfer section to a cooling structure in such a way that said contact surface remains free,
- wherein the device comprises:
  - a spring section which is separate from said heat transfer section and which is arranged to exert on the heat transfer section a spring force pushing said contact surface in a direction in which the contact surface is intended to contact said object;
- wherein said heat transfer section comprises:
  - a fastening ring having an inner edge, and
  - a plurality of heat transfer tabs which are fastened at one end to the inner edge of the fastening ring and another, free end of which is directed in a substantially perpendicular direction to a plane defined by the fastening ring; and
- wherein said spring section comprises:
  - a support ring fastened on top of said fastening ring and having an inner surface, and
  - a plurality of spring tabs supported to the inner surface of said support ring and arranged to exert on said plurality of heat transfer tabs said spring force.

2. The device according to claim 1, wherein the heat transfer section comprises a plurality of heat transfer elements arranged in a form of a ring, whereby said contact surface is formed by surfaces of the plurality of heat transfer elements which face toward an interior of the ring.

3. The device according to claim 2, wherein said spring section comprises one or more spring elements disposed outside of said heat transfer elements pushing the heat transfer elements toward the center of the ring.

4. The device according to claim 1, wherein the said spring section is supported to said cooling structure.

5. The device according to claim 1, wherein said spring tabs form a continuous band of spring tabs extending around the inner surface of said support ring, which band of spring tabs is supported to one or more grooves at the inner surface of said support ring.

6. The device according to claim 1, further comprising an upper fastening ring fastened on top of said support ring and arranged to support the free end of each of said plurality of heat transfer tabs in a position located farther away from a center line of a ring formed by the plurality of heat transfer tabs than a center of the plurality of heat transfer tabs.

7. The device according to claim 1, wherein said heat transfer section is manufactured from copper or silver.

8. The device according to claim 7, wherein the heat transfer section manufactured from copper or silver is coated with gold.

9. The device according to claim 1, wherein said spring section is manufactured from a beryllium-copper alloy.

10. An arrangement for cooling the object being moved within the cryostat, comprising the cooling structure and the device according to claim 1 fastened thereto.

11. An arrangement for cooling an object being moved within a cryostat, comprising a cooling structure and a device for providing a thermally conductive coupling in order to cool the object being moved within the cryostat fastened thereto, the device comprising:

a heat transfer section forming a contact surface for said object, means for fastening the heat transfer section to the cooling structure in such a way that said contact surface remains free, wherein the device comprises:

a spring section which is separate from said heat transfer section and which is arranged to exert on the heat transfer section a spring force pushing said contact surface in a direction in which the contact surface is intended to contact said object; and wherein:

the arrangement comprises a first cooling structure and a first device fastened thereto, the arrangement comprises a second cooling structure and a second device fastened thereto, the first cooling structure comprises an opening that is concentric with said first and second devices, in said first device a contact surface of the first device forms a ring having a first diameter, in said second device a contact surface of the second device forms a ring having a second diameter that is smaller than the first diameter, and a diameter of said opening is larger than said first and second diameters.

12. The arrangement according to claim 11, wherein said second cooling structure forms a target region for fastening the object being cooled in the cryostat.

13. The arrangement according to claim 11, wherein:

the arrangement comprises a sample holder that forms at least a part of said object being moved within the cryostat, the sample holder comprises a first portion that is in diameter compatible with said first diameter, the sample holder comprises a second portion that is in diameter compatible with said second diameter, and said second portion is arranged in that part of the sample holder which is located, in relation to the first portion, towards a same direction as said second cooling structure is located in relation to said first cooling structure.

* * * * *